Patented Apr. 29, 1930

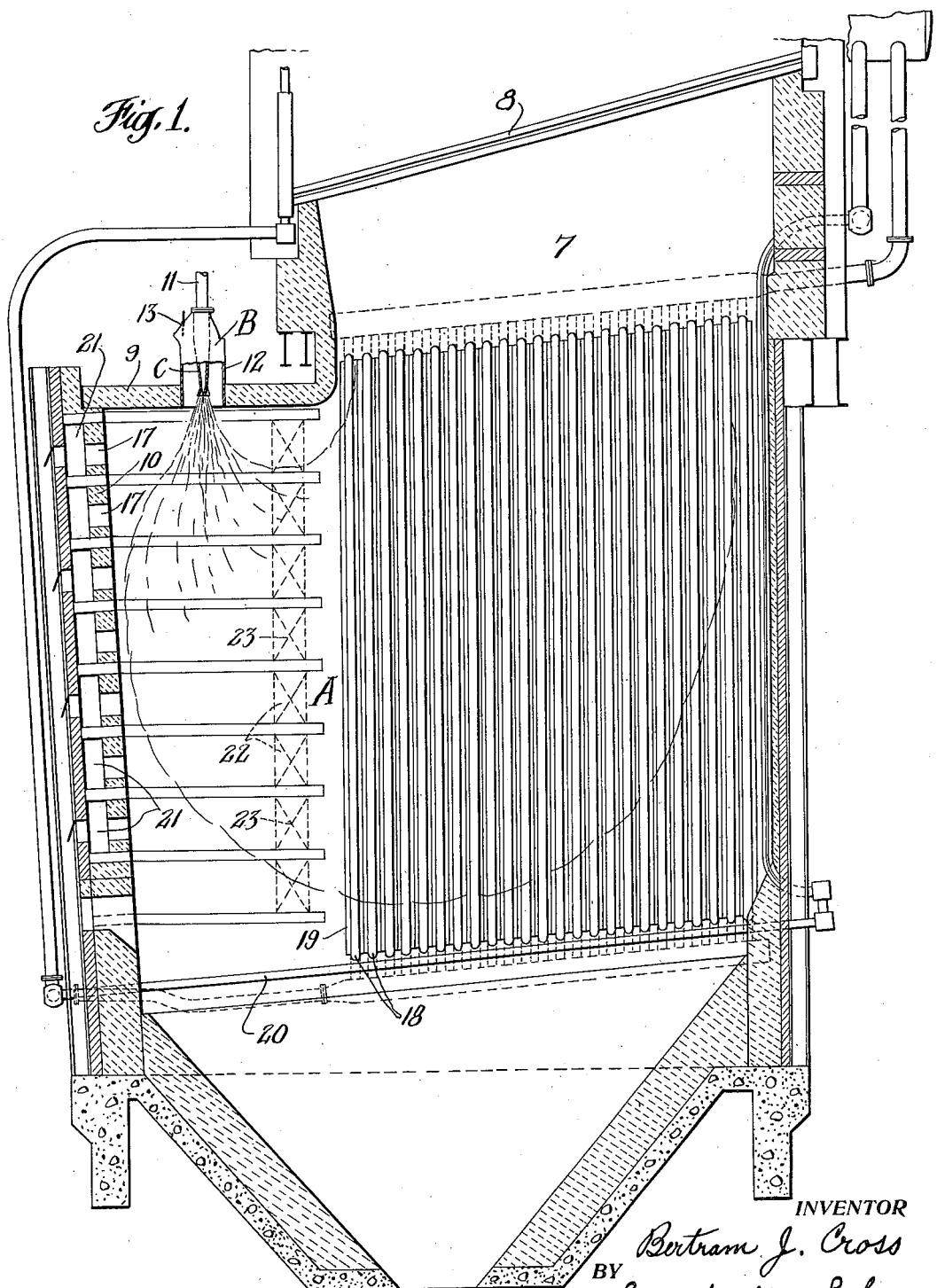

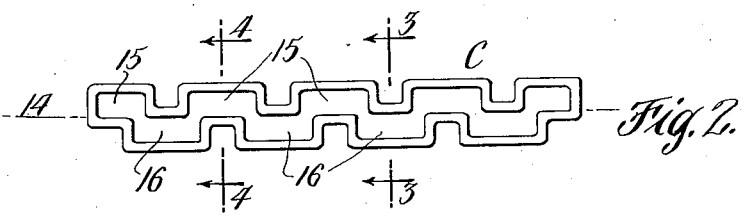
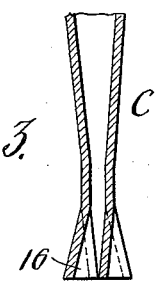
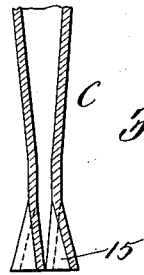
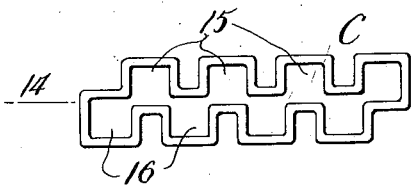
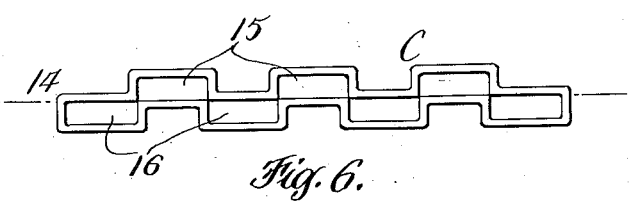
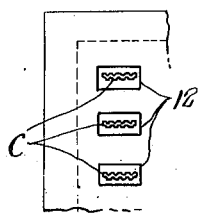

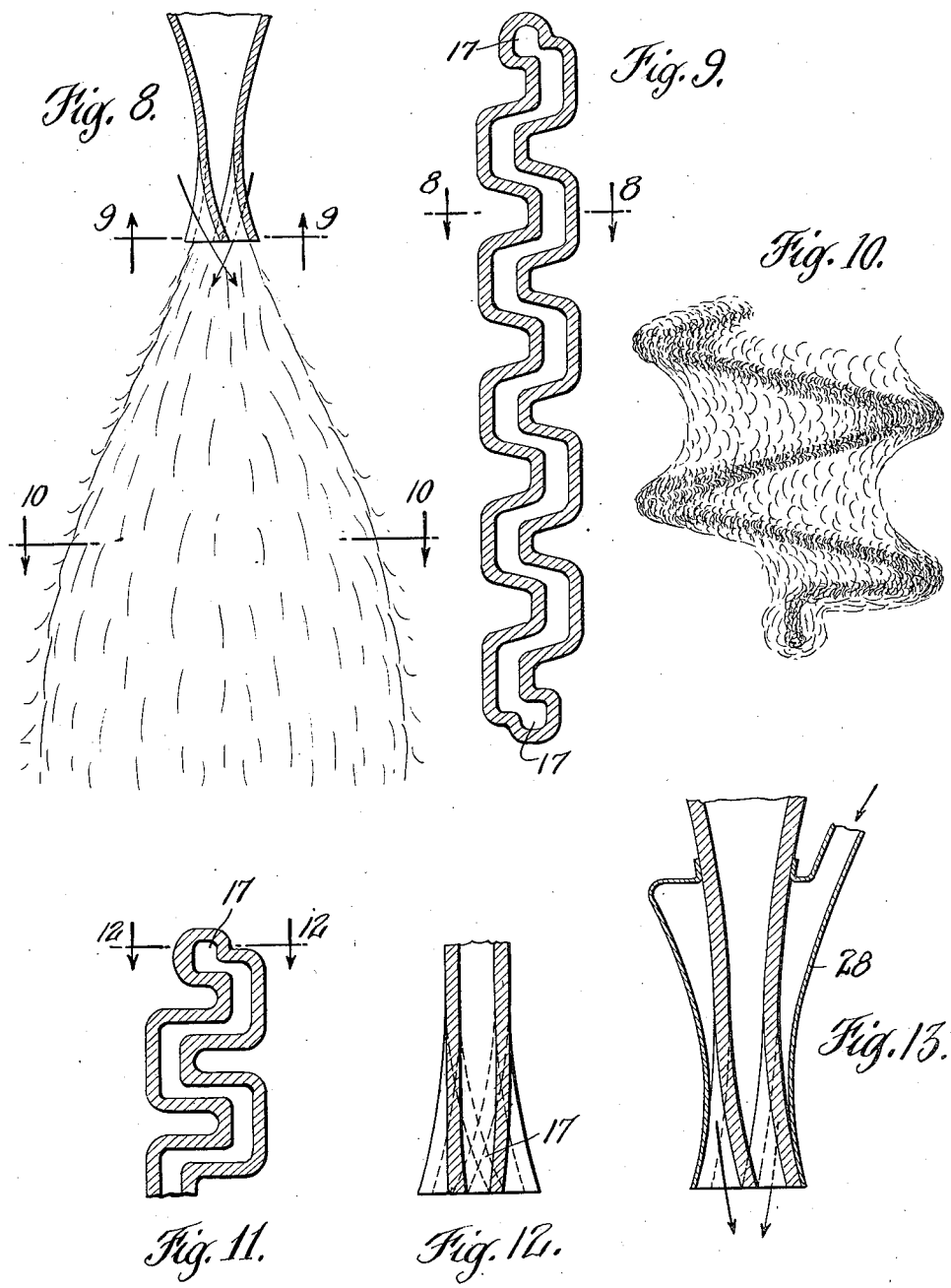

1,756,321

UNITED STATES PATENT OFFICE

BERTRAM J. CROSS, OF PIERMONT, NEW YORK, ASSIGNOR TO INTERNATIONAL COMBUSTION ENGINEERING CORPORATION, A CORPORATION OF DELAWARE

PULVERIZED-FUEL-BURNING APPARATUS

Application filed January 16, 1925. Serial No. 2,751.

This invention relates to apparatus for the burning of finely divided fuels, such for example as pulverized coal, and is especially useful in the furnaces or combustion chambers of boilers.

One of the primary objects of my invention is to expedite combustion of the fuel thru the securing of more intimate and effective admixture of the fuel with the necessary air to support combustion whereby, if desired, a smaller combustion chamber may be utilized.

A further object is to make the fuel leaving the burner spread.

Another object of the invention is to secure a maximum surface exposure of the entering fuel streams.

Still another object of my invention is to secure certain advantages in that type of combustion chamber in which at least a substantial portion of the combustion space is defined by water walls or evaporating surfaces.

How the foregoing, together with such other objects, as may hereinafter appear, or are incident to my invention, are obtained, is illustrated in the accompanying drawings wherein:

Fig. 1 is a vertical section thru a combustion chamber having my improvements;

Fig. 2 is a bottom plan view of a burner nozzle embodying certain of my improvements;

Figs. 3 and 4 are sections taken respectively on the lines 3—3 and 4—4 of Fig. 2;

Figs. 5 and 6 are views corresponding to Fig. 2 but illustrating modifications of my invention;

Fig. 7 is a fragmentary diagrammatic view illustrating a modified arrangement of the burners with reference to the combustion chamber over that shown in Fig. 1.

Fig. 8 is a section taken on the line 8—8 of Fig. 9 and illustrates the manner in which the fuel is made to spread;

Fig. 9 is an enlarged section of the burner of Fig. 8, taken on the line 9—9 of Fig. 8;

Fig. 10 is a cross section through the fuel and flame stream taken on the line 10—10 of Fig. 8;

Fig. 11 is a fragmentary sectional view showing a modified burner;

Fig. 12 is a section taken on the line 12—12 of Fig. 11;

And Fig. 13 shows still another modification.

Referring now to Fig. 1 the reference character A denotes the combustion chamber which has an outlet 7 in the upper part thereof over which extend tubes 8 of a boiler. The fuel is admitted thru a row of burners B which deliver the fuel thru the roof or arch 9 in a downward direction adjacent to front wall 10 of the chamber. The fuel, preferably with carrying air, is supplied to the burners by pipes 11.

Each of the burners comprises the casing 12, provided with a damper controlled air inlet 13 and the nozzle C.

The nozzles merge from a round cross section to a flat elongated cross section at the discharge end thereof i. e. they are of a fish tail type. The elongated discharge portion of the nozzles is constructed, preferably, as shown in Fig. 2. It will be seen on inspection of this figure that the line 14 indicates the median plane of the nozzle and that on opposite sides of this median plane the nozzle has spaced channels 15 and 16, the channels on one side coming opposite the spaces between channels on the other side. These channels diverge from the median plane i. e. they flare alternately and oppositely from the said median plane. The channels communicate with each other at adjacent corners of adjacent channels as indicated in Fig. 2. It will be seen, therefore, that a very large surface is presented to the air and that in addition thereto the stream, considered as a whole, may be said to be composed of a plurality of diverging portions or sections. The fuel stream is made to spread, as will further appear, as a result of which there is less density, the particles are well separated and conditions most favorable to each particle being surrounded by combustion air, are set up.

Air for combustion is supplied thru the burner casings and around the entering fuel stream delivered from each burner nozzle, such air being preferably induced. By virtue of the divergence, the extended area presented, and the difference in velocity as between the entering fuel and the induced air, an appreciable amount of eddying is immediately set up and ignition is very promptly instituted with the flame being held up well to the burners. The entering fuel streams immediately meet with additional air supplied for combustion thru the inlets 17 in the front wall. These inlets are arranged in rows at successive levels so that the fuel and flame stream is successively brought into contact with fresh air, that is to say air not robbed of its oxygen. The air admitted thru the inlets 17 is also preferably induced and is delivered at right angles to the entering fuel and flame stream so that the effect is to produce eddying and prompt and thoro admixture.

Thus there is initial eddying, maximum surface exposure and wide spreading of the entering fuel; there is further eddying produced by the air admitted thru the burner casings, which air has access to a very large proportion of the fuel; and lastly there is still further eddying produced by the air admitted thru the inlets 17 at successive levels.

The net result is that the fuel begins to burn more quickly and combustion is furthered more rapidly in the earlier stages of the travel of the fuel and flame stream than for burners heretofore used, and a hotter flame is produced. Viewed from this aspect, combustion of pulverized fuel can be completed in a smaller combustion chamber than heretofore used in practice in this art without brick work and slagging difficulties.

The arrangement of nozzles shown in Figs. 5 and 6 is in all substantial respects the same as that already described. In Fig. 5 however the channels are approximately square in cross section whereas they are oblong rectangular in Fig. 2. In Fig. 6 the channels do not connect with one another at their discharge ends.

Because of the hot flame produced and the expedition of ignition and combustion in its early stages, the arrangement is particularly well suited to a combustion chamber in which the major portion of the combustion space is defined by water walls, subject to radiant heat. Such water walls absorb heat at a very high rate and, therefore, tend to unduly lower furnace temperature which would produce smoky operation if combustion is not thoroly established and well carried forward before the flame stream enters the region defined by the water walls. In Fig. 1, I have shown the rear portion of the two side walls and also the rear wall as being covered by water walls in the form of a plurality of tubes 18 provided with overlapping fins 19, the tubes being connected into the circulation of the boiler as indicated. I have also illustrated a water screen in the lower part of the combustion chamber composed of a plurality of suitably spaced pipes 20 suitably connected into the circulation of the boiler, preferably in series with the tubes 18 which cover the rear or bridge wall of the combustion chamber. The tubes covering the side walls are preferably connected into the boiler circulation in parallel with the tubes of the screen. The function of the screen is to cool the precipitating ash leaving the fuel and flame stream before it lodges on the bottom below slag forming temperatures.

In order to still further expedite and properly support combustion, I prefer to leave the forward portions of the side walls as well as the front wall uncovered so that the entering fuel is subject to the radiant heat from the refractories; and, in addition to this, I also prefer to preheat the combustion air by passing the same thru the channels 21 formed in the forward portions of the side walls and the front wall, the air being admitted thru the inlets 22 considerably controlled by dampers 23, as indicated diagrammatically in dotted lines.

In the arrangement of Fig. 1 the nozzles are substantially parallel to the front wall. In the arrangement of Fig. 7 the nozzles are arranged parallel to the side walls and present an edge toward the front wall. This latter arrangement is preferred, particularly where it is desired to secure more violent admixture than is possible in the arrangement of Fig. 1. In this connection it will be observed that the air admitted thru the upper rows of inlets 17 will have an opportunity to pass in between the streams delivered by the nozzles before the streams unite in one large stream and will cooperate with the air admitted downwardly to produce comparatively more violent eddying and therefore quicker admixture. The effect of the entering air on applicant's novel form of fuel stream will readily be appreciated by those skilled in the art.

Referring now to Figs. 8 and 9, the burner is in general the same as those previously described, but the passages are reversely curved and the connecting spaces are angularly disposed. The fuel and flame stream is caused to spread as shown and the general character of the stream in cross section is roughly indicated in Fig. 10. While there are regions of greater density, as indicated, the fuel particles are nevertheless well separated. The denser portions illustrate the large stream surface presented to the air, as well as the great entrainment characteristic. The lighter portions indicate the eddies and the carrying out of fuel particles from the more dense portions. The end portions 17 balance the stream.

In Fig. 13, I have shown the application of a correspondingly shaped casing 28, through which air, preferably heated, is introduced under pressure for increasing initial eddying and promptness of mixture. If desired, a very large proportion of the air for combustion may be thus supplied, producing a very short and very hot flame.

In accordance with my invention there will be no central "core" which must travel a relatively long distance before ignition and combustion can take place.

I claim:

1. A pulverized fuel burner including a nozzle member having a fuel discharge tip portion including a passage of long and narrow cross-section and a plurality of flaring channels discharging therefrom, said channels being arranged side by side with their outlets alternately staggered.

2. A pulverized fuel burner including a nozzle member having a fuel discharge tip portion including a plurality of flaring channels discharging therefrom, said channels being arranged side by side with their outlets alternately staggered.

3. A pulverized fuel burner including a nozzle member having a fuel discharge tip portion including a plurality of flaring channels discharging therefrom, said channels being arranged side by side with their outlets alternately staggered and said channels intercommunicating at adjacent edges.

4. A pulverized fuel burner including a nozzle member having a fuel discharge tip portion including a plurality of flaring channels discharging therefrom, said channels being arranged side by side with their outlets alternately staggered, together with means for introducing air adjacent the said discharge tip portion.

5. A pulverized fuel burner including a nozzle member having a fuel discharge tip portion including a passage of long and narrow cross-section and a plurality of flaring channels discharging therefrom, said channels being arranged side by side with their outlets alternately staggered, together with means for introducing air adjacent the said discharge tip portion.

In testimony whereof, I have hereunto signed my name.

BERTRAM J. CROSS.